United States Patent [19]
Henning

[11] 3,980,039
[45] Sept. 14, 1976

[54] ELECTRICALLY OPERATED BOW MOUNT FOR TROLLING MOTOR

[75] Inventor: Andrew R. Henning, Richland, Mich.

[73] Assignee: Shakespeare Company, Columbia, S.C.

[22] Filed: Oct. 29, 1975

[21] Appl. No.: 626,850

[52] U.S. Cl. ............................... 115/41 R; 74/29; 74/422; 115/18 E; 248/4
[51] Int. Cl.² ........................................ B63H 21/26
[58] Field of Search .................. 115/18 E, 17, 18 R, 115/18 A, 41 R, 41 HT; 248/4, 284; 114/144 A; 46/244 B; 74/29, 422

[56] References Cited
UNITED STATES PATENTS

| | | | |
|---|---|---|---|
| 2,631,799 | 3/1953 | Poulin | 115/41 R |
| 2,747,819 | 5/1956 | Aldrich et al. | 248/4 |
| 3,187,709 | 6/1965 | Edwards | 115/41 R |
| 3,765,362 | 10/1973 | Gitchel | 114/144 A |
| 3,809,343 | 5/1974 | Adams et al. | 115/17 |

FOREIGN PATENTS OR APPLICATIONS

| | | | |
|---|---|---|---|
| 309,789 | 7/1933 | Italy | 115/41 R |

*Primary Examiner*—Duane A. Reger
*Assistant Examiner*—Jesus D. Sotelo
*Attorney, Agent, or Firm*—Hamilton, Renner & Kenner

[57] ABSTRACT

The motor tube carrying the trolling motor at one end and a steering motor at the other end is mounted on a plate detachably supported on the bow or deck of a boat. A gear driven by an electric motor is mounted on the mounting plate and meshes with a rack on the motor tube to raise and lower it in vertical position, and raising the motor tube a predetermined amount trips a latch on the plate to allow the motor tube to rotate bodily with the gear to a horizontal stowed position on the boat. An electronic control box on the mounting plate has a receiver for remote control operation of all three motors.

10 Claims, 10 Drawing Figures

ELECTRICALLY OPERATED BOW MOUNT FOR TROLLING MOTOR

BACKGROUND OF THE INVENTION

Prior known bow mounts for trolling motors have been manually operated, and in some cases have required manipulation of means for manually adjusting the orientation of the motor with respect to the boat each time the motor is swung from stowed position to operating position, or vice versa. Other constructions have required considerable dexterity and effort in manually swinging the motor from one position to the other, and have also required the operator to be in a position proximate to the bow mount when manipulating it from one position to the other.

Other disadvantages with such prior constructions have included difficulties in positively locking and manually adjusting the depth of the trolling motor, in stabilizing the bow mount in operating and stowing positions, and malfunction of the complicated lever and linkage arrangements employed.

SUMMARY OF THE INVENTION

It is a general object of the present invention to provide a novel bow mount for a trolling motor which is electrically operated by remote control between a vertical operating position and a horizontal stowed position.

Another object is to provide a novel electrically operated bow mount in which the operation of the trolling propeller and the orientation and speed of the trolling motor is operated by remote control.

A further object is to provide improved gear and rack means for raising and lowering the motor tube in vertical operating position and for swinging it to and from horizontal stowed position.

Another object is to provide improved latch means for connecting the motor tube to the bow mounting plate in the vertical operating position and for automatically releasing the motor tube for swinging movement when the tube is raised a predetermined amount.

A still further object is to provide a gear operating motor on the bow mount and a steering motor on the end of the motor tube opposite the trolling motor, all of said motors being operated by an electronic control unit having a receiver for remote control operation.

These and other objects are accomplished by the improvements comprising the present invention, a preferred embodiment of which is shown by way of example in the accompanying drawings and described in detail in the following specification. Various modifications and changes in details of construction are comprehended within the scope of the appended claims.

DESCRIPTION OF A PREFERRED EMBODIMENT

Figures 3, 4:
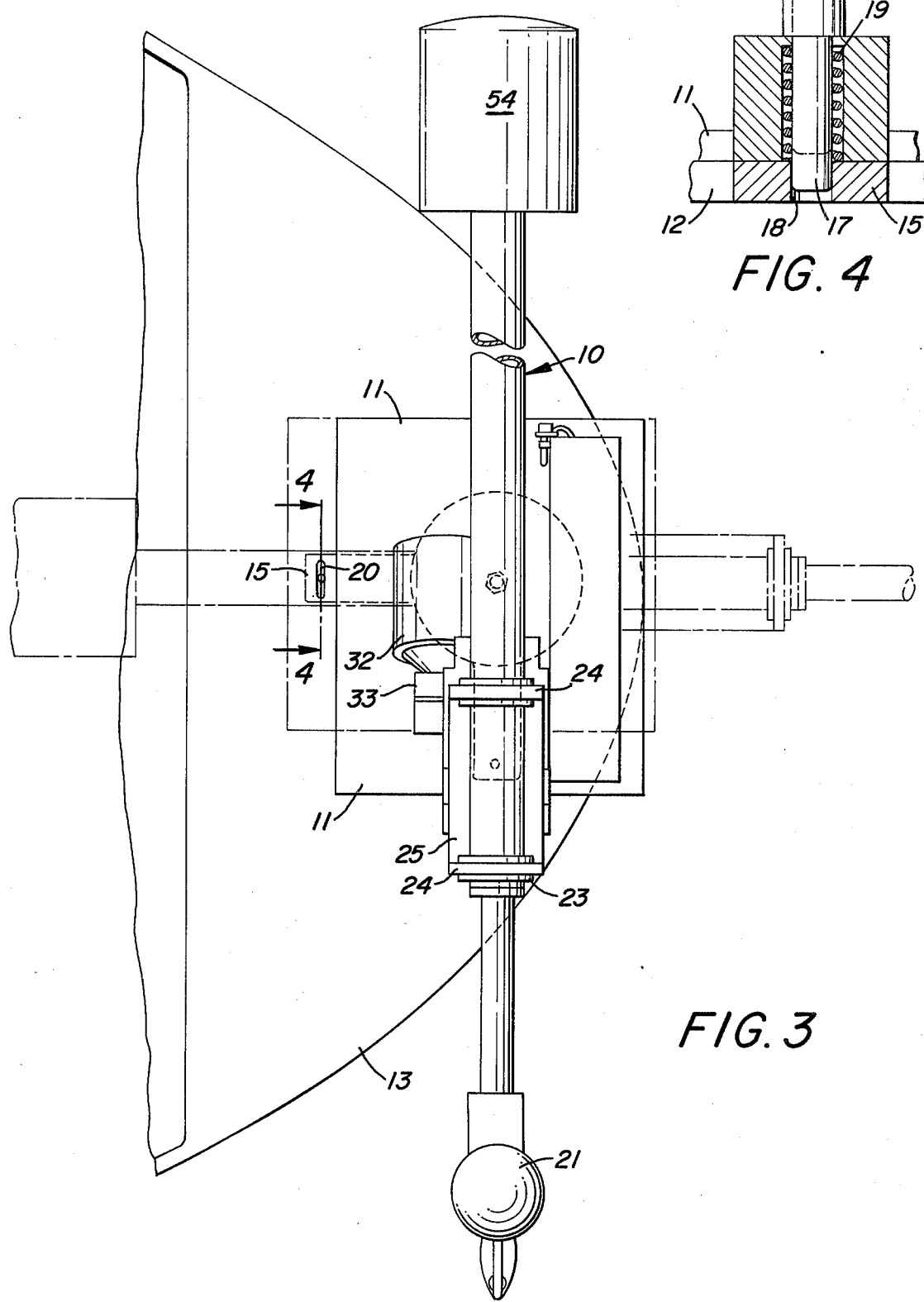
FIG. 3 is a top plan view with the motor in horizontal stowed position but shown in full lines rotated 90° from the position of FIG. 2 indicated in phantom.
FIG. 4 is a detail cross sectional view of the latch for holding the mounting plate for the motor tube in rotated position.
Figure 5:
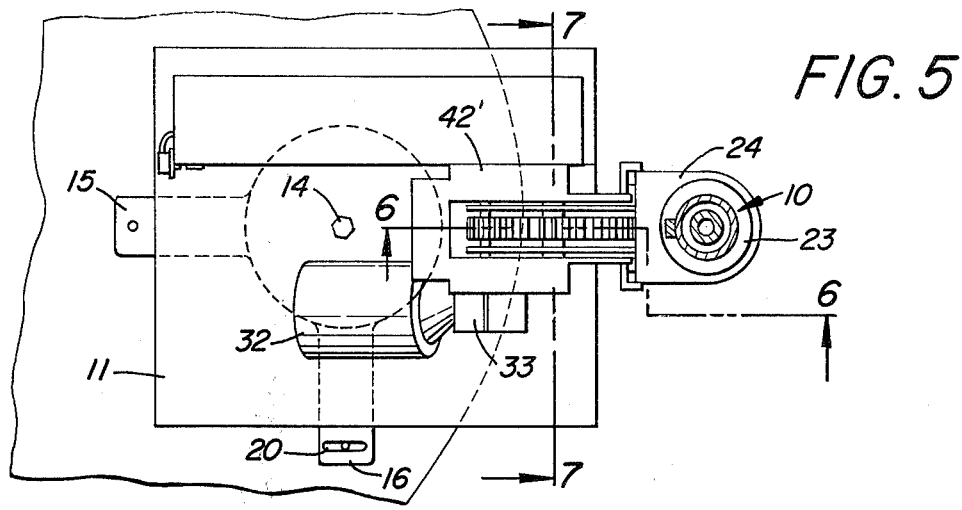
FIG. 5 is a plan sectional view of the bow mount in the vertical operating position.

The motor tube indicated generally at 10 is supported on a mounting plate 11 which is rotatable on a support plate 12 secured to the deck of a boat 13 at the bow thereof. The support plate has a central pivot 14 on which the plate 11 is rotatably mounted, and has two radial arms 15 and 16 at 90° to each other. These arms are adapted selectively to extend under a vertical latch pin 17 on the edge of plate 11 and have holes 18 at their outer ends to register therewith, as shown in FIG. 4. A compression spring 19 urges the pin 17 toward registering position and the pin has a pull handle 20. As shown in FIG. 5, the latch pin 17 engages arm 15 to hold the plate in one position, and as shown in FIG. 3 it engages arm 16 to hold the plate in a position rotated 90°. The position of the plate 11 shown in phantom lines in FIG. 3 corresponds to the position of FIG. 5.

The motor tube 10 has a trolling motor 21 on its lower end, and an elongated gear rack 22 is secured on the tube in a position facing the mounting plate 11 and extending longitudinally of the tube. The tube and rack are slidably mounted in spaced-apart plastic bushings 23 which are mounted in the legs 24 of a bracket yoke having a web plate 25 connecting the legs. Secured to the web plate 25 and extending outwardly therefrom over the mounting plate 11 are two laterally spaced plates 26 which are parallel to the axis of the tube 10. These plates are pivotally mounted in a U-shaped mounting bracket indicated generally at 27 extending upwardly from the plate 11, for swinging the tube about a horizontal axis from the operating to the stowed position.

The plates 26 extend between spaced-apart upright legs 28 of the mounting bracket 27 and are journaled on a shaft 29 extending between and secured in the legs 28. A spur gear 30 is secured on shaft 29 between the plates 26, and the gear extends through a slot 31 in web plate 25. Gear 30 is driven by a reversible electric motor 32 supported on the mounting plate 11 and powered by a storage battery (not shown) carried in the boat. Preferably, the motor 32 is operatively connected to gear 30 through a conventional worm and worm gear in gear housing 33 driving the pinion gear 34 engaging gear 30.

Figure 1:
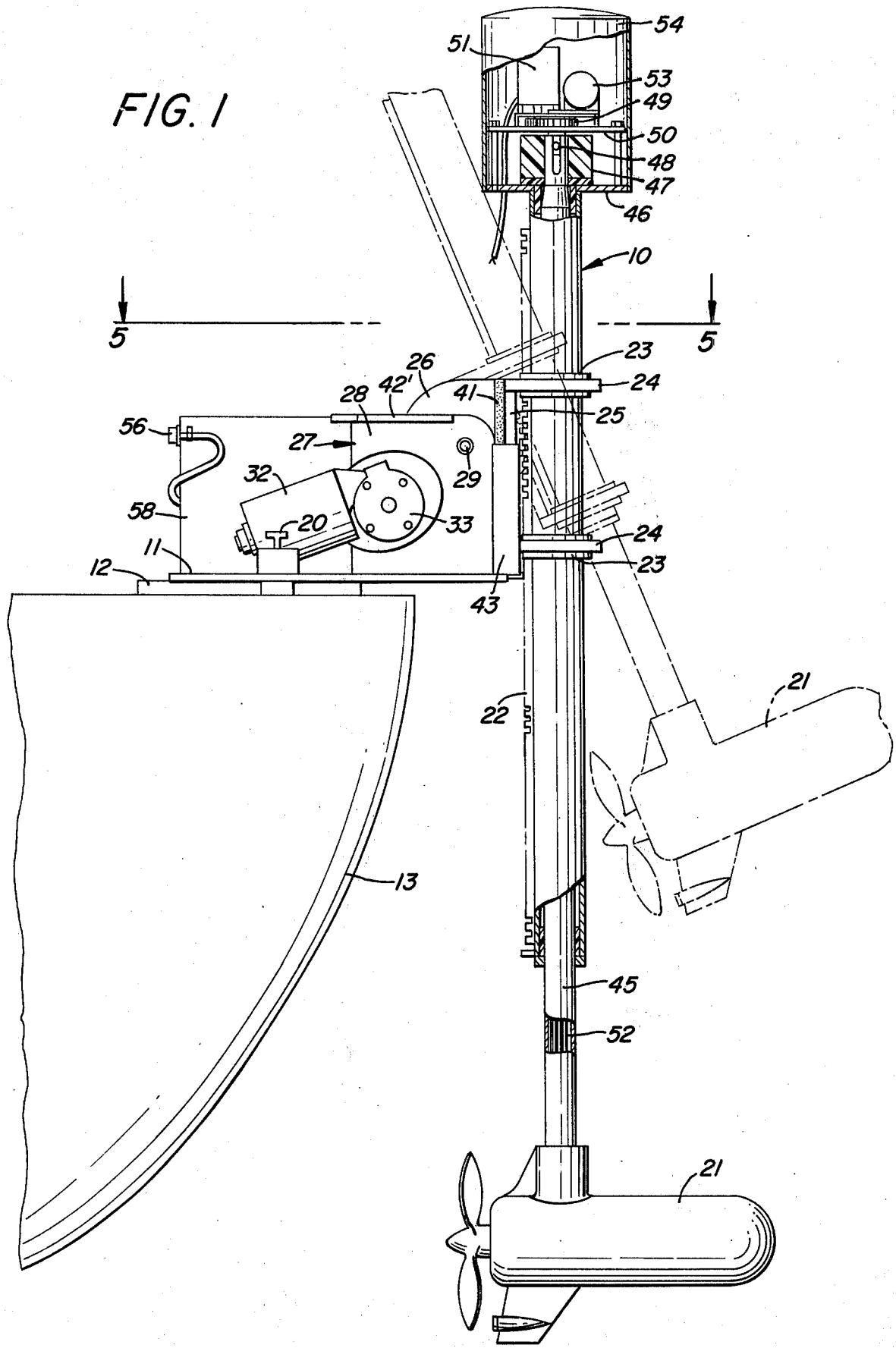
FIG. 1 is a side elevation partly in section of the novel bow mount with the trolling motor tube shown in full lines in the vertical operating position.
Figure 6:
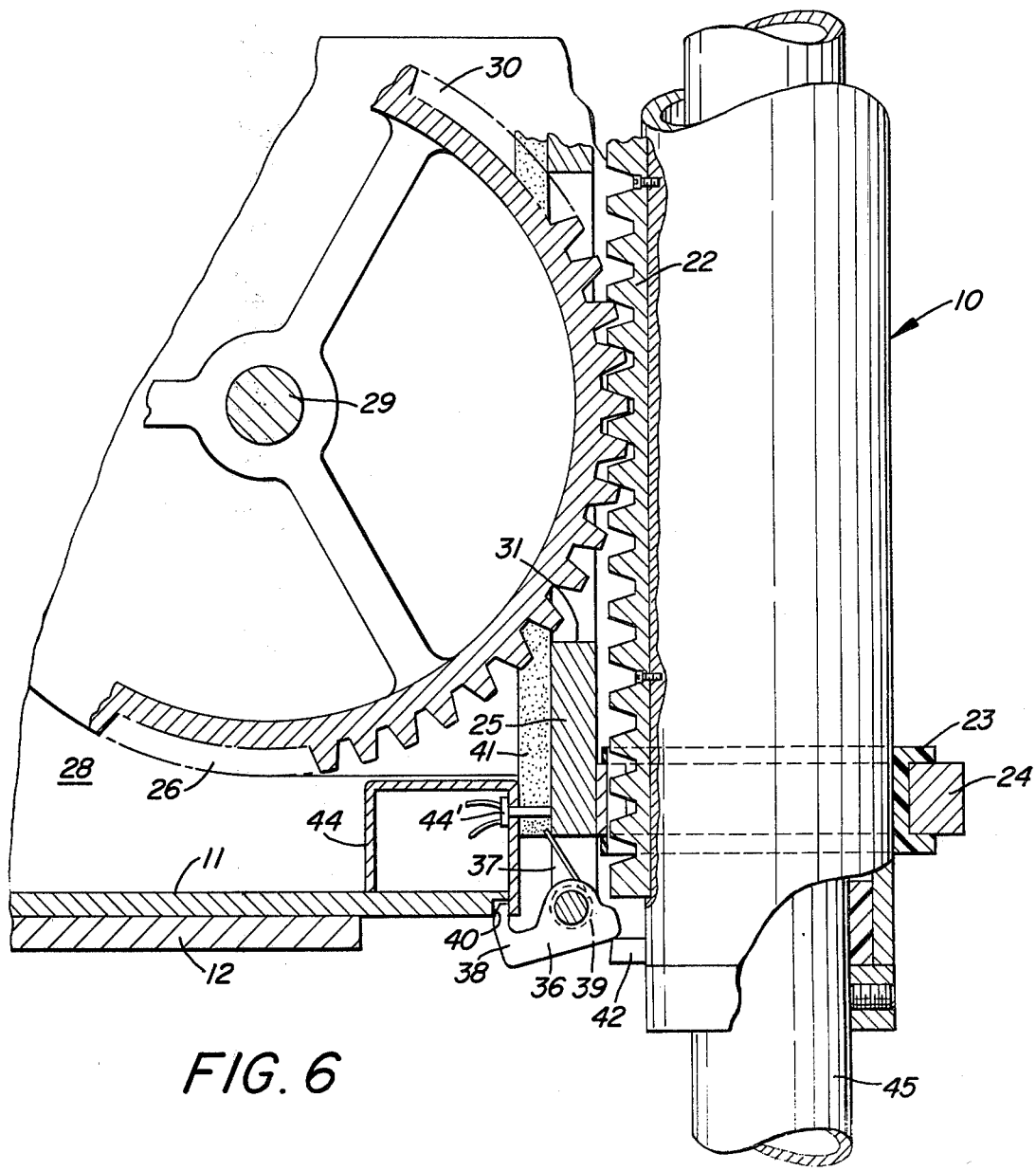
FIG. 6 is an enlarged partial sectional view on line 6—6 FIG. 5.
Figure 9:
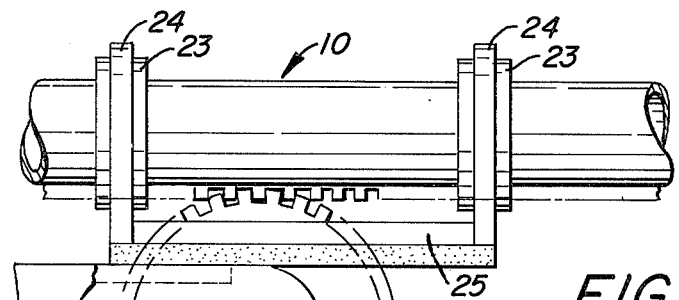
FIG. 9 is an enlarged partial side elevation similar to FIG. 2, with parts broken away and in section.
Figure 8:
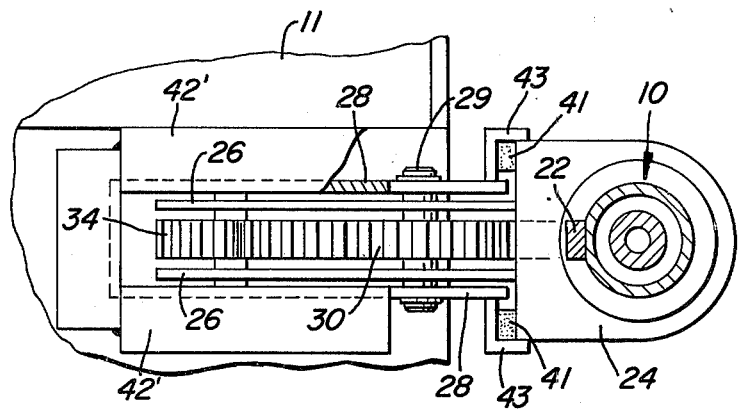
FIG. 8 is an enlarged partial plan view similar to FIG. 5.
Figure 7:
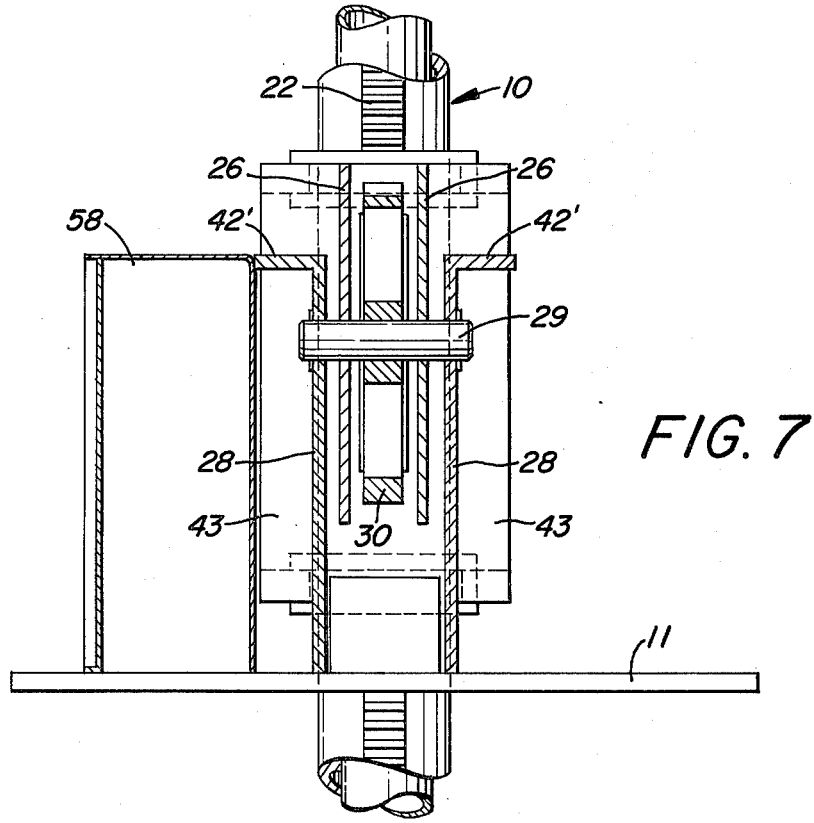
FIG. 7 is an enlarged cross-sectional view taken on line 7—7 of FIG. 5.

In the operating position of the trolling motor shown in FIGS. 1 and 6, rotation of the gear 30 will raise or lower the motor tube by engagement with rack 22. As shown in FIG. 6, a latch 36 is pivoted in a clevis 37 on the lower edge of web 25, and has a finger 38 which is normally urged by a coil spring 39 into a notch 40 in plate 11 for locking the bracket yoke 24,25 and the motor tube 10 in vertical position. A lug 42 on the lower end of tube 10 adjacent to the lower end of the rack 22 is adapted to abut the latch 36 at the end opposite finger 38 and release the finger 38 from notch 40 when the tube 10 is raised to the position of FIG. 6.

Figure 2:
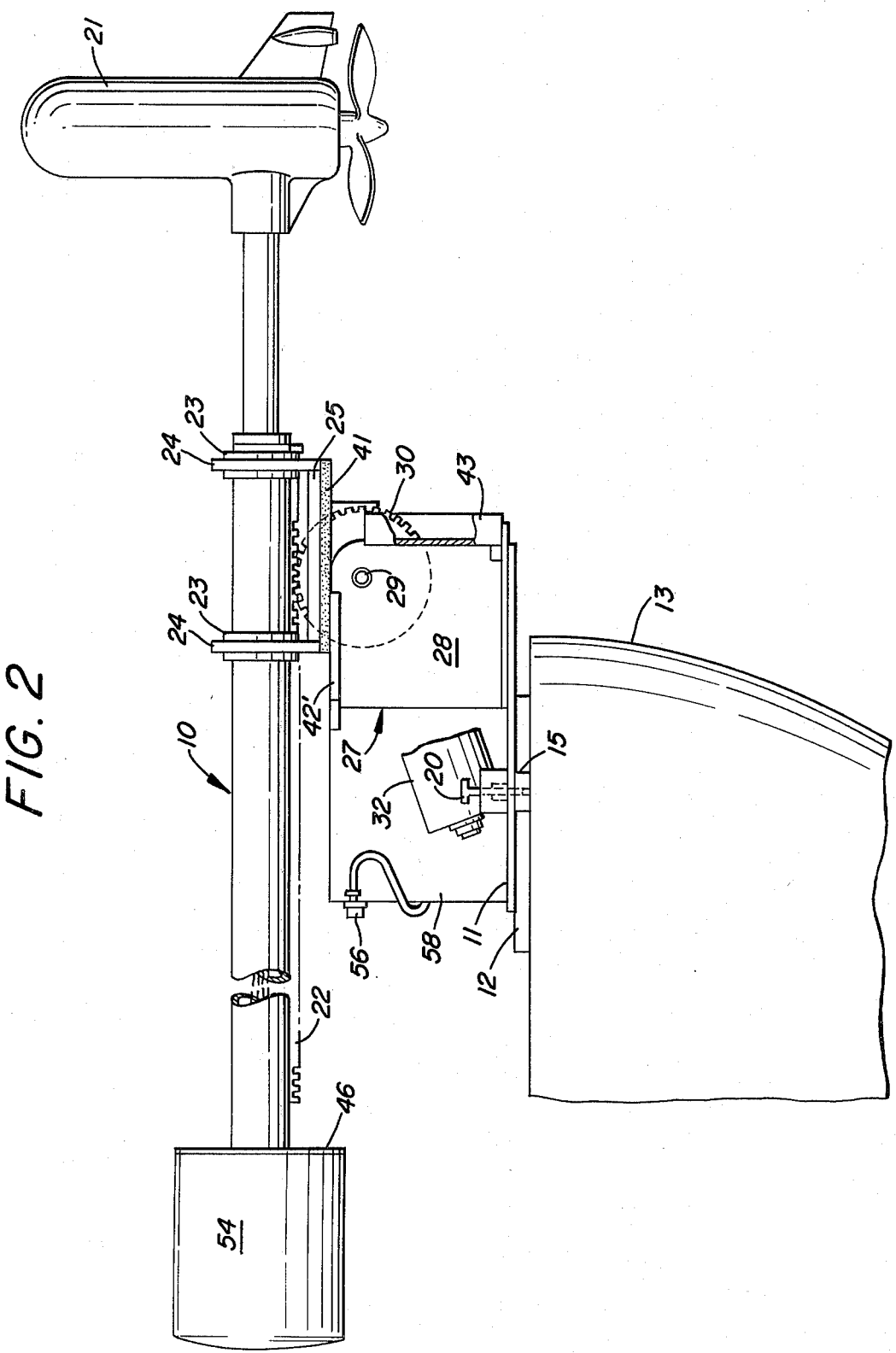
FIG. 2 is a side elevation with parts broken away showing the motor tube in horizontal stowed position.

Because of the engagement of gear 30 with rack 22, when the latch is released further rotation of gear 30 will swing the motor tube 10, bracket 24,25 and plates 26 counterclockwise about the shaft 29 as a pivot, to the horizontal stowed position above the boat deck, as shown in FIG. 2. The web 25 has rubber bumper pads 41 thereon which abut angles 42 secured to the tops of plates 28. In this position the lock pin 17 may be pulled upwardly to release it from engagement with support plate 12 and the mounting plate 11 and motor tube 10 supported thereon swung horizontally through 90° to the out-of-the-way position of FIG. 3 crosswise of the boat.

When it is desired to return the motor tube to the vertical operating position of FIG. 1, the motor tube is swung horizontally to the position longitudinally of the boat, and rotation of motor 32 is reversed to swing the motor tube clockwise in a vertical plane. The bumper pads 41 abut laterally spaced vertical angles 43 secured to the inner edges of plates 28 when the motor tube reaches vertical position and the latch finger 38 automatically snaps into the notch 40. Continued rotation of gear 30 lowers the trolling motor 21 to the desired depth. An inverted channel 44 on the inner edge of plate 11 extends through the plates and forms a tunnel opening representing a conduit for wires running from motor 21 to a limit switch 44'. When in the stowed position, motor 21 will be rendered inoperative because switch 44' will not be contacted by bracket 25 thereby removing all power from motor 21 and preventing the accidental and potentially hazardous out-of-water operation of the propeller.

A tubular shaft 45 is rotatably mounted in the motor tube 10, and the trolling motor is mounted on the lower end of said shaft. The upper end of shaft 45 is rotatably supported on a supporting plate 46 on the upper end of motor tube 10, and the shaft is rotatable in a terminal mounting block 47 fixed on the plate 46. The upper end of the shaft 45 is slotted and is keyed by a pin 48 to the shaft of a drive gear 49 supported on an upper plate 50. The gear 49 is driven by a reversible electric motor 51 supported on the plate 50 for rotating shaft 45 to change the orientation of the trolling motor 21 for steering the boat 13. Conductor wires 52 from motor 21 pass through shaft 45 to contacts on its upper end, and sliding contacts on the inner bore of the terminal block are connected through the block to terminals on its outer surface, said outer terminals being connected to a terminal station 53 by conductor wires (not shown). Thus, electric current is supplied to the trolling motor while permitting rotation of the shaft 45. A removable housing 54 fits over and encloses the plates 46 and 50 and the elements supported thereon.

Figure 10:
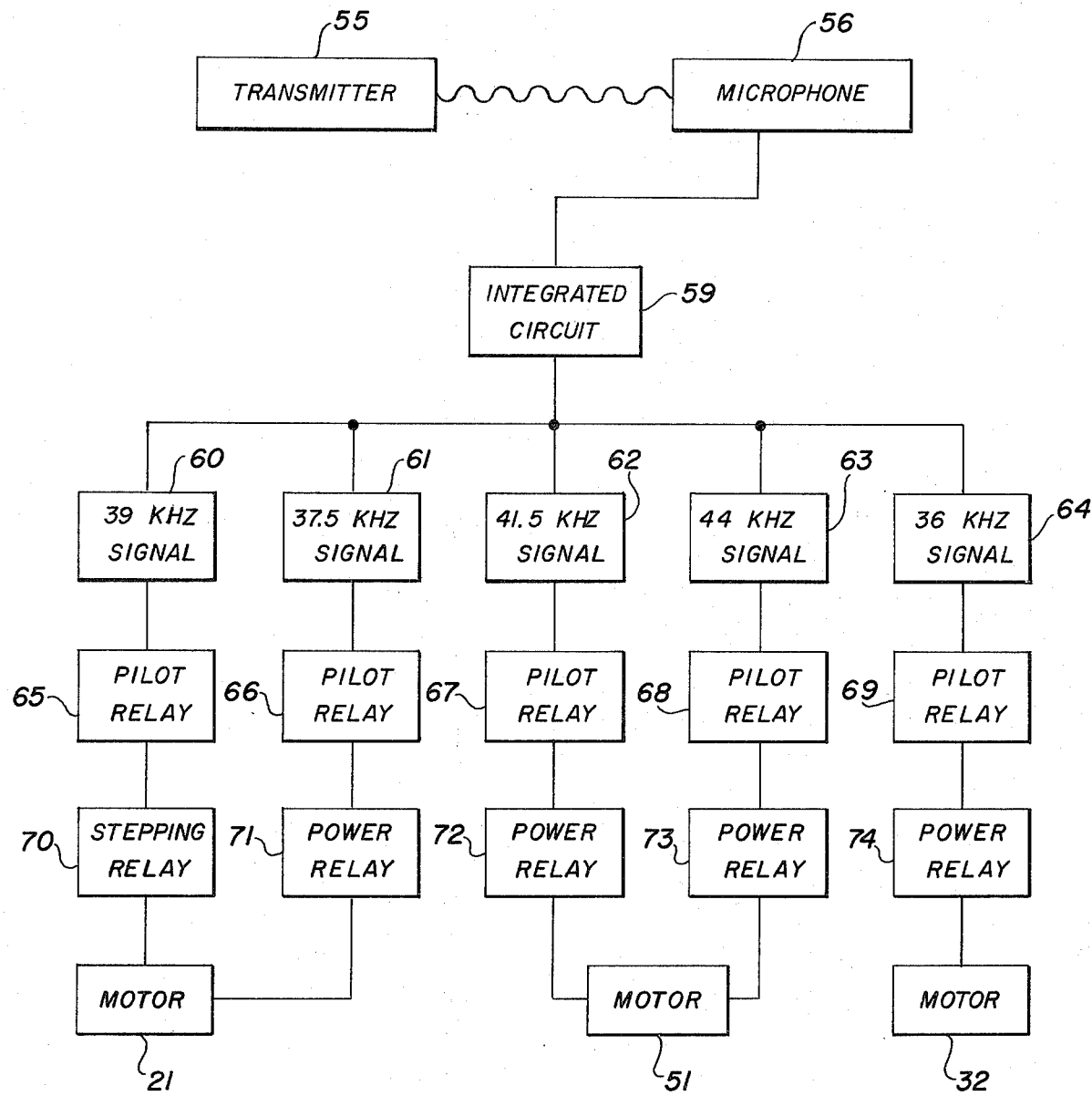
FIG. 10 is a block diagram of the electronic circuitry for remote control of all of the motors.

The manner in which the motors 21, 32 and 51 are remote controlled is shown in FIG. 10. A conventional transmitter 55, of a size capable of being held in the hand, includes a standard oscillator circuit with a capacitor switching arrangement which allows the user to select a desired control frequency. The face of the transmitter may be provided with a plurality of multi-position rocker switches such that when one of the switches is depressed a capacitance is connected in parallel with the secondary winding of the oscillator coil. A different amount of capacitance is associated with each rocker switch such that the various combinations of capacitance and inductance determines the frequency associated with each rocker switch.

The frequency signal is picked up by a microphone 56 which, as shown in FIG. 1, is attached to the outside of a control box 58 mounted on plate 11. Within box 58 are the remaining electrical components shown in FIG. 10. Microphone 56 senses the transmitted signal and couples it to an integrated circuit 59 where it is amplified, clipped and shaped in a conventional manner to produce output pulses. In the example shown in FIG. 10, there are five distinct frequencies being utilized, a 39 KHZ frequency signal 60 to control the speed of motor 21 either in a "high," "medium," "low" or "stop" mode; a 37.5 KHZ signal 61 to control the direction of motor 21, either "forward" or "reverse"; 41.5 KHZ and 44 KHZ signals, 62 and 63 respectively, to control steering motor 51, right and left, respectively, and a 36 KHZ signal 64 to control vertical position motor 32, either driving motor tube 10 "up" or "down." Signals 60, 61, 62, 63 and 64 are fed to pilot relays 65, 66, 67, 68 and 69, respectively, to close the same which, in turn, energizes its associated stepping relay 70 and power relays 71, 72, 73 or 74 connecting the boat's storage battery to a control function wired into the unit.

Upon each depression of the rocker switch associated with the speed of the motor, the 39 KHZ signal will activate stepping relay 70 to pass through the "stop," "low," "medium" and "high" speed ranges. Power relay 71 has three positions, one position holding motor 21 in operation in a "forward" direction, a neutral position, and a third holding motor 21 in operation in a "reverse" direction. Thus, if the boat was traveling in the forward direction, the first depression of the rocker switch associated with the direction of the motor would cause power relay 71 to go to the neutral position and a second depression of the rocker switch would cause the direction of motor 21 to be reversed. Relays 72, 73 and 74 are two position relays which remain operable as long as the frequency signal is being received, that is, as long as the appropriate rocker switch is being depressed.

It should thus be evident that a remote controlled trolling motor constructed according to the present invention accomplishes the objectives set forth herein and otherwise substantially improves the trolling motor art.

I claim:

1. Apparatus for mounting a trolling motor having a motor tube on the bow of a boat between an operating position with the motor tube vertical and a stowed position with the motor tube horizontal, comprising a mounting plate for attachment to the bow, a gear having a shaft journaled on said plate, an electric motor on said plate driving said gear, a rack on said motor tube meshing with said gear, a bracket pivoted on said gear shaft and slidably mounting said motor tube, latch means releasably connecting said bracket in the vertical operating position to said plate, and means on said motor tube to release said latch means when said motor tube is raised a predetermined amount to allow said tube to rotate bodily with said gear to the horizontal stowed position.

2. Apparatus as described in claim 1, wherein a mounting shaft for the trolling motor is rotatably mounted in said motor tube and a steering motor is operatively mounted on the opposite end of said mounting shaft.

3. Apparatus as described in claim 2, wherein electronic control means having a receiver for operating the driving motor and the steering motor by remote control signals is supported on said mounting plate.

4. Apparatus as described in claim 3, wherein the electronic control means is adapted to operate the trolling motor.

5. Apparatus as described in claim 2, wherein the mounting plate is rotatably mounted on a support plate secured to the bow of the boat for rotating the motor tube horizontally in the stowed position.

6. Apparatus as described in claim 5, wherein a releasable latch on the mounting plate engages the support plate in predetermined position.

7. Apparatus as described in claim 1, wherein electronic control means having a receiver for operating the electric motor drive by remote control signals is supported on said mounting plate.

8. Apparatus as described in claim 7, wherein the electronic control means is adapted to operate the trolling motor.

9. Apparatus as described in claim 1, wherein the mounting plate is rotatably mounted on a support plate secured to the bow of the boat for rotating the motor tube horizontally in the stowed position.

10. Apparatus as described in claim 9, wherein a releasable latch on the mounting plate engages the support plate in predetermined positions.

* * * * *

UNITED STATES PATENT OFFICE
CERTIFICATE OF CORRECTION

Patent No. 3,980,039     Dated September 14, 1976

Inventor(s) Andrew R. Henning

It is certified that error appears in the above-identified patent and that said Letters Patent are hereby corrected as shown below:

Column 3, line 9, "42" should read -- 42' --.

Signed and Sealed this

Twenty-fifth Day of January 1977

[SEAL]

Attest:

RUTH C. MASON
*Attesting Officer*

C. MARSHALL DANN
*Commissioner of Patents and Trademarks*